United States Patent
McGarrigle et al.

(10) Patent No.: US 7,500,553 B2
(45) Date of Patent: Mar. 10, 2009

(54) BELT CONVEYOR FOR TRANSFERRING A WEB THREADING TAIL IN A WEB MANUFACTURING MACHINE AND A METHOD FOR CHANGING THE BELT LOOP OF A BELT CONVEYOR FOR A WEB THREADING TAIL IN A WEB MANUFACTURING MACHINE

(75) Inventors: Bob McGarrigle, Hoppers Crossing (AU); Mikko Tähkäpää, Jyväskylä (FI); Veli-Pekka Koljonen, Kärnä (FI); Mikael Junttonen, Muurame (FI); Matti Lehtonen, Lannevesi (FI)

(73) Assignee: Metso Paper, Inc., Helsinki (FI)

( * ) Notice: Subject to any disclaimer, the term of this patent is extended or adjusted under 35 U.S.C. 154(b) by 615 days.

(21) Appl. No.: 11/077,507

(22) Filed: Mar. 10, 2005

(65) Prior Publication Data

US 2006/0011318 A1   Jan. 19, 2006

(30) Foreign Application Priority Data

Mar. 11, 2004   (FI) .................................. 20045068

(51) Int. Cl.
B65G 23/44   (2006.01)
(52) U.S. Cl. ..................................... 198/813
(58) Field of Classification Search ................ 198/813, 198/810.04, 816; 355/3 BE, 3 R, 16; 474/136
See application file for complete search history.

(56) References Cited

U.S. PATENT DOCUMENTS

| | | | | |
|---|---|---|---|---|
| 293,383 A * | 2/1884 | Wagner | ...................... | 198/813 |
| 380,400 A * | 4/1888 | Menke et al. | ............... | 198/813 |
| 387,727 A * | 8/1888 | Middleton | .................. | 198/813 |
| 704,388 A * | 7/1902 | Schwingel | .................. | 198/813 |
| 808,122 A * | 12/1905 | Tanck | .......................... | 198/816 |
| 819,710 A * | 5/1906 | Barnes | ....................... | 198/816 |
| 832,361 A * | 10/1906 | Blevins | ...................... | 198/816 |
| 1,000,974 A * | 8/1911 | Anderson | .................... | 198/813 |
| 1,292,199 A * | 1/1919 | Williams | ..................... | 198/813 |
| 1,347,121 A * | 7/1920 | Rice | ............................ | 198/813 |
| 1,792,195 A * | 2/1931 | Stresau | ....................... | 198/842 |
| 1,796,127 A * | 3/1931 | Stephenson | .................. | 198/813 |

(Continued)

FOREIGN PATENT DOCUMENTS

DE   100 09 188 A1   8/2001

(Continued)

*Primary Examiner*—Gene Crawford
*Assistant Examiner*—William R Harp
(74) *Attorney, Agent, or Firm*—Stiennon & Stiennon

(57) ABSTRACT

A belt conveyor for transferring a web threading tail in a web manufacturing machine has a frame construction (15) and a belt loop (20), which is arranged around rolls (16, 17). The belt conveyor has adjustment elements (21) for changing the relative position of the rolls (16, 17). The adjustment elements (21) include transfer elements (22), which are arranged in connection with both edges of the frame construction (15). The adjustment elements (21) act in mutual co-operation for moving the roll (17) by operating the transfer elements (22) from one side of the frame construction (15). A belt loop for the belt conveyor for a web threading tail in a web manufacturing machine is readily changed from one side of the conveyor.

8 Claims, 4 Drawing Sheets

U.S. PATENT DOCUMENTS

| | | | | |
|---|---|---|---|---|
| 2,541,080 | A * | 2/1951 | Lyon | 198/816 |
| 2,808,924 | A * | 10/1957 | Wood | 198/816 |
| 2,939,571 | A * | 6/1960 | Robertson | 198/816 |
| 3,118,315 | A * | 1/1964 | Loosli | 198/816 |
| 3,921,793 | A * | 11/1975 | Hutchinson et al. | 198/813 |
| 4,616,920 | A | 10/1986 | Itoigawa et al. | |
| 4,626,095 | A | 12/1986 | Berger | |
| 4,803,804 | A * | 2/1989 | Bryant | 474/113 |
| 5,156,261 | A * | 10/1992 | Dorner | 198/816 |
| 5,174,435 | A * | 12/1992 | Dorner et al. | 198/806 |
| 5,797,481 | A * | 8/1998 | Uber et al. | 198/813 |
| 5,896,979 | A * | 4/1999 | Hokari et al. | 198/807 |
| 5,947,263 | A * | 9/1999 | Uber et al. | 198/813 |
| 6,109,427 | A * | 8/2000 | Hosch et al. | 198/835 |
| 6,298,981 | B1 * | 10/2001 | Hosch et al. | 198/813 |
| 6,405,914 | B1 | 6/2002 | Broom et al. | |
| 6,422,382 | B1 * | 7/2002 | Ertel et al. | 198/860.1 |
| 6,630,057 | B2 | 10/2003 | Broom et al. | |
| 6,648,198 | B2 | 11/2003 | Demers | |
| 6,685,009 | B1 * | 2/2004 | Hosch et al. | 198/813 |
| 6,731,895 | B2 * | 5/2004 | Hamada et al. | 399/121 |
| 6,752,261 | B1 * | 6/2004 | Gaeddert et al. | 198/861.1 |
| 6,997,307 | B2 * | 2/2006 | Iseli | 198/813 |
| 7,322,462 | B2 * | 1/2008 | Landry | 198/813 |
| 2003/0089756 | A1 * | 5/2003 | Demers | 226/95 |
| 2003/0089765 | A1 | 5/2003 | Demers | |

FOREIGN PATENT DOCUMENTS

| | | |
|---|---|---|
| EP | 1 063 188 A2 | 12/2000 |
| EP | 1 127 978 A2 | 8/2001 |
| FI | 105573 B | 9/2000 |
| FI | 5440 | 7/2002 |
| GB | 1 533 720 | 3/1976 |
| WO | WO 03/018909 A1 | 3/2003 |

* cited by examiner

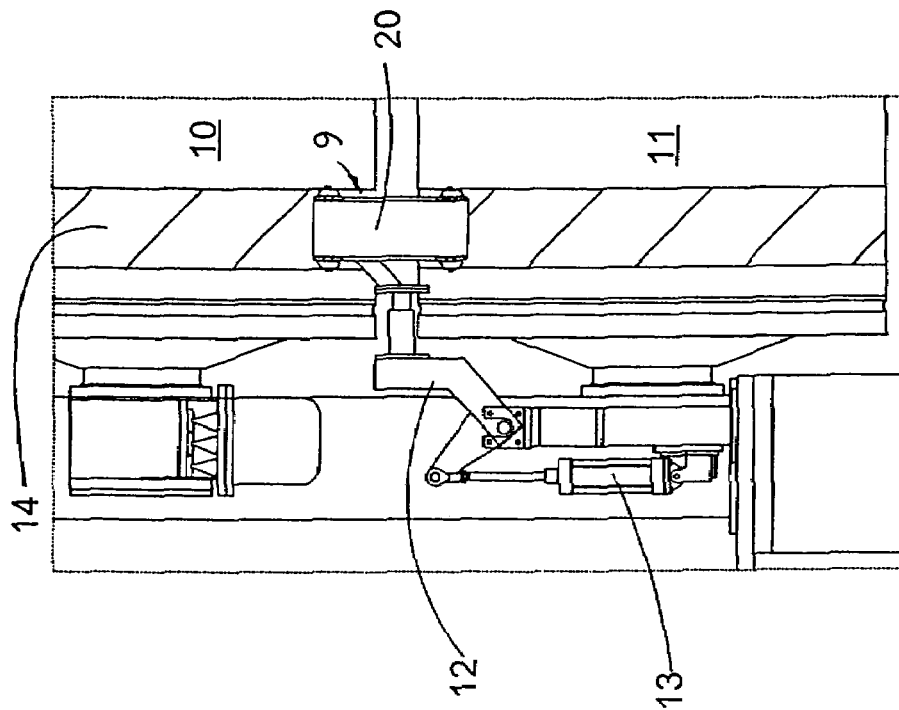
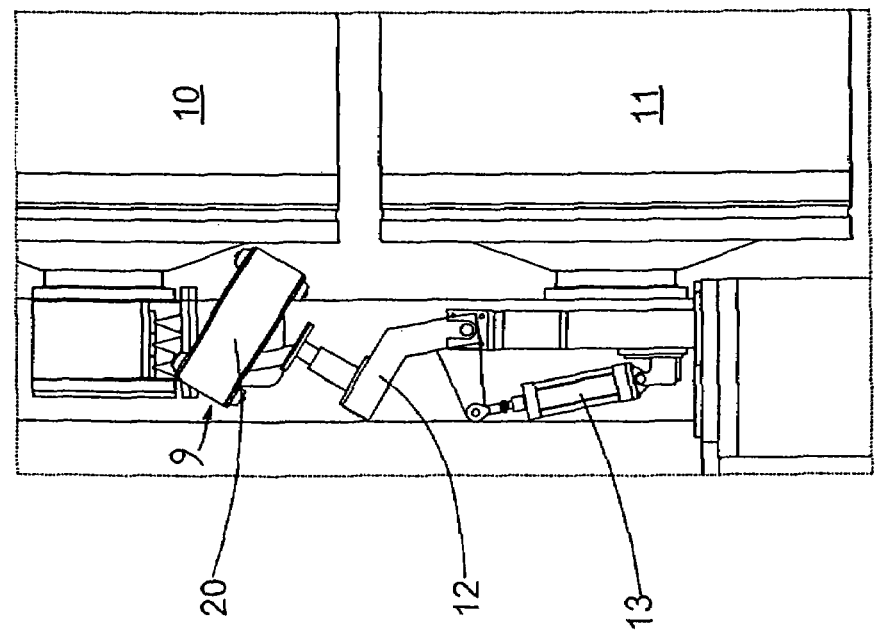
Fig. 1b
Fig. 1a

BELT CONVEYOR FOR TRANSFERRING A WEB THREADING TAIL IN A WEB MANUFACTURING MACHINE AND A METHOD FOR CHANGING THE BELT LOOP OF A BELT CONVEYOR FOR A WEB THREADING TAIL IN A WEB MANUFACTURING MACHINE

CROSS REFERENCES TO RELATED APPLICATIONS

This application claims priority on Finnish Application No. 20045068, Filed Mar. 11, 2004, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a belt conveyor for transferring a web threading tail in a web manufacturing machine, and to a method for changing the belt loop of a belt conveyor for a web threading tail in a web manufacturing machine.

WO publication No. 03018909 discloses a belt conveyor having a frame construction and at least two pulleys or rolls therein, a belt loop arranged around the rolls, and adjustment elements arranged in connection with the frame construction and at least one of the rolls for adjusting the belt loop tension by changing the relative position of the rolls. In the proposed tail threading device as well as in the other known tail threading devices based on a belt loop, the belt loop is tensioned on both sides of the frame construction. In other words, both ends of the roll are moved separately. For this, between the frame construction and the roll, there are adjustment elements, which are usually based on bolt tensioning and fastening.

In practice, the belt conveyor is located in the vicinity of rotating or otherwise moving machine parts for transferring the web threading tail from one machine section to another. A belt loop that is usually formed of an air permeable fabric needs to be changed from time to time, whereat at least one of the rolls must be moved by means of the adjustment elements. Reaching to the tensioning and fastening bolts is difficult in a fixedly mounted belt conveyor. This is the case in particular as regards the bolts located on the outermost side of the frame construction. Consequently, changing the belt loop is slow and difficult, often even dangerous. Furthermore, the operation of the adjustment elements and an accurate positioning of the roll are difficult. In practice, the rolls must additionally be aligned such that the belt loop keeps in place on top of the frame construction. An incorrectly positioned roll leads to belt conveyor malfunctions as well as to rapid belt loop wear and even damage.

SUMMARY OF THE INVENTION

The object of the invention is to provide a new type of belt conveyor for transferring a web threading tail in a web manufacturing machine, being easier and faster to service than heretofore and avoiding erroneous positions of the pulley or roll.

Another object of the invention is to provide a new method for changing the belt loop in a belt conveyor for the web threading tail in a web manufacturing machine, with which method the belt loop change can be carried out more easily and accurately than heretofore. The belt conveyor according to the invention comprises a new type of adjustment elements, which can be used from one side of the belt conveyor frame construction. Using the method according to the invention, loosening the fastening, moving the roll, and re-tensioning the fastening can be carried out in a simple and easy way without accessing at all the outermost side of the frame construction. Consequently, changing the belt loop is notably easier than heretofore. In addition, operating the adjustment elements is safe and misalignment of the roll can be avoided by them. Irrespective of their versatile features, the construction of the adjustment elements is simple. Furthermore, the adjustment elements can be installed even in existing belt conveyors.

The invention is described below in more detail by making reference to the enclosed drawings illustrating some of the embodiments of the invention.

BRIEF DESCRIPTION OF THE DRAWINGS

FIG. 1a is a machine directional view of one belt conveyor according to the invention in the rest position.

FIG. 1b is a machine directional view of the belt conveyor of FIG. 1a in the operating position.

DESCRIPTION OF THE PREFERRED EMBODIMENTS

Figure 2:
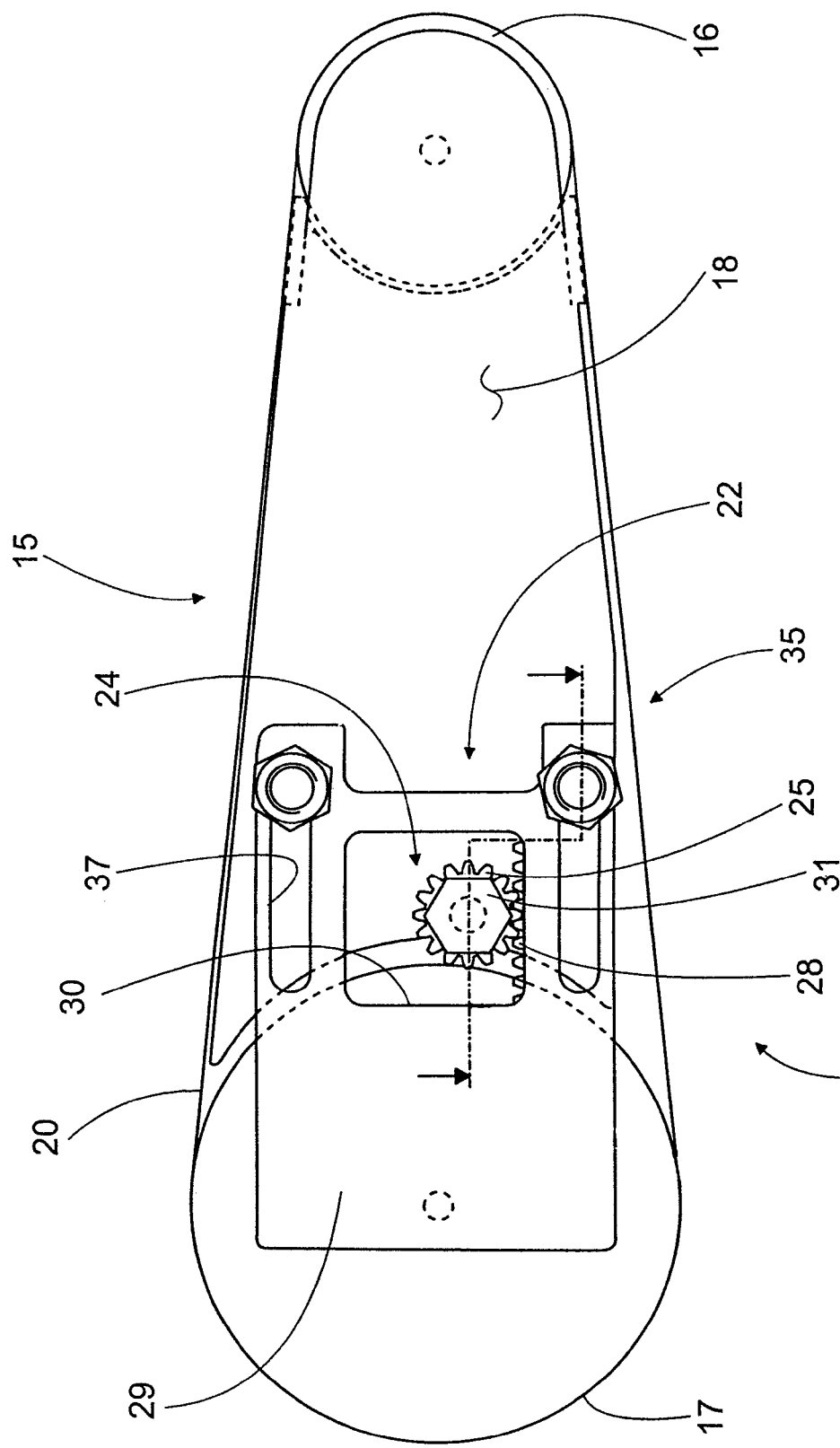
FIG. 2 is a side view of a belt conveyor according to the invention.

A belt conveyor 9 according to the invention is used particularly for transferring and guiding a web threading tail in paper and board machines and other similar web manufacturing machines. FIGS. 1a and 1b show a belt conveyor 9 according to the invention both in the rest and operating positions. In these drawings the belt conveyor 9 is set in the dryer section of a paper machine in connection with dryers 10 and 11. For example the dryer section can comprise 20 to 30 belt conveyors, which can be turned to the rest position during the normal operation of the dryer section. For this, the belt conveyor 9 is turnably supported to the dryer section construction by means of an articulated arm 12. In the belt conveyors illustrated in FIGS. 1a and 1b the articulated arm 12 is mounted with bearings at one point to the dryer section construction. Correspondingly, the belt conveyor 9 is fastened to one branch of the articulated arm 12 and the actuator 13 to the other branch. Here the actuator 13 is a pneumatic cylinder, which is also fastened to the dryer section construction. With suitable dimensioning, the belt conveyor 9 can be moved in a simple manner to a sufficient distance from the dryer and the web. In addition, the belt conveyor 9 is easy and fast to turn from the rest position to the operating position and back. In FIGS. 1a and 1b the articulated arm 12 is mounted with bearings along a machine directional line.

In this case the actuator 13 can be used to turn the belt conveyor 9 completely away from between the dryers 10 and 11, whereat damaging and soiling of the belt conveyor 9 is unlikely. Likewise, servicing the belt conveyor 9 is possible with the dryer section in normal operation. By arranging suitable adjustment allowances in the articulated arm and its supporting, a single type of belt conveyor 9 can be adapted even in many different positions. Another method used is to mount the articulated arm with bearings along a cross-machine directional line. In this case the belt conveyor 9 can be turned away from the vicinity of the machine components (not shown). Besides the dryer section, the belt conveyor 9 can as well be used in other locations in the web manufacturing machine, such as in the press section or the finishing section. The web threading tail 14 is shown in FIG. 1*b*.

Figure 3:
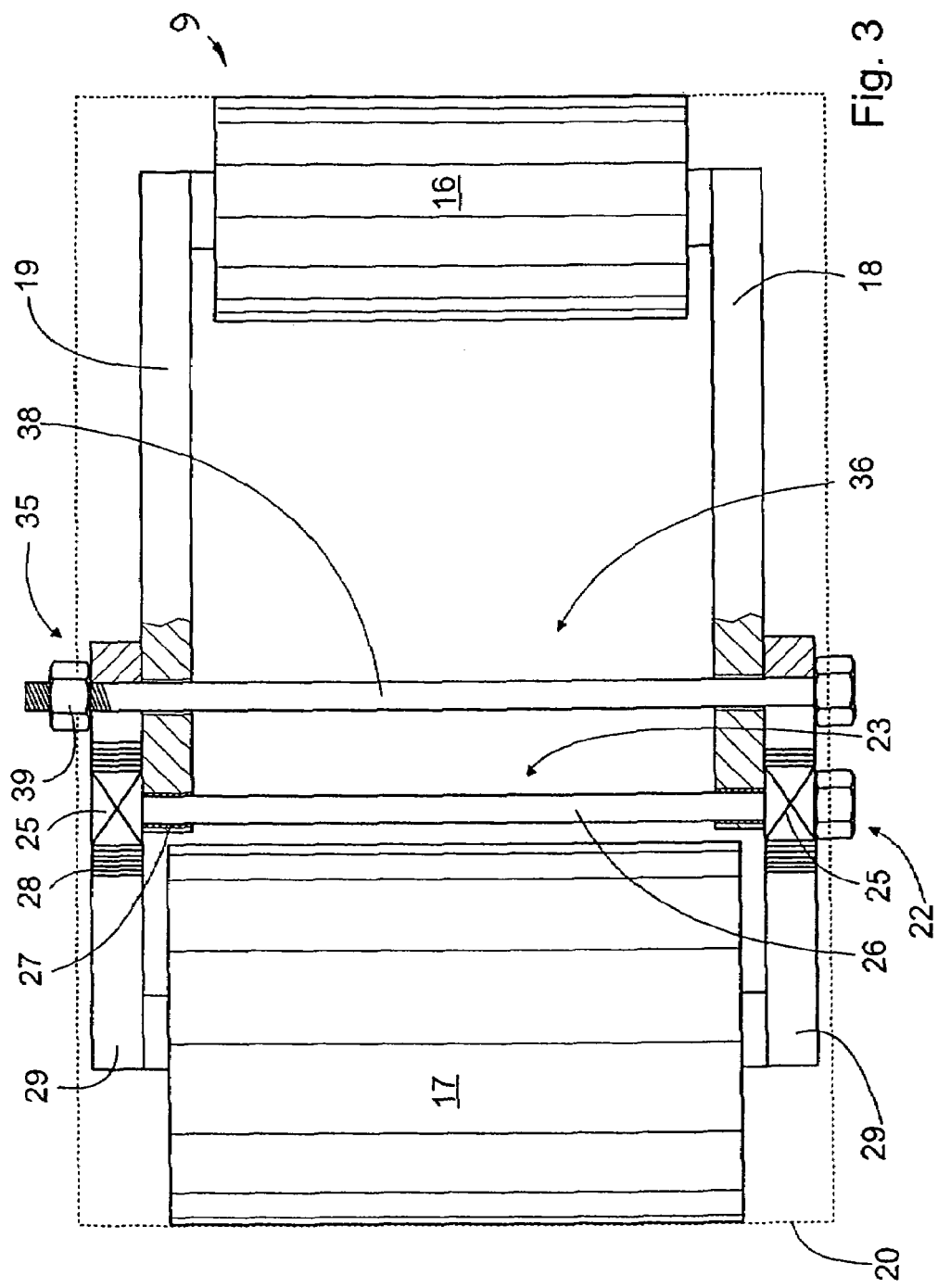
FIG. 3 is a principal drawing of the belt conveyor of FIG. 2 seen from above.

As shown in FIG. 3, the belt conveyor 9 according to the invention comprises a frame construction 15 and at least two pulleys or rolls 16 and 17 therein. The frame construction 15 is composed of side plates 18 and 19, which are supported to each other with suitable constructions (not shown). The belt conveyor 9 additionally comprises a belt loop 20 arranged around the rolls 16 and 17. In practice, the belt loop 20 is usually an air permeable fabric. In addition, the belt loop 20 is arranged to rotate in the travel direction of the web threading tail 14 supported by the rolls 16 and 17. A vacuum can be generated within the belt loop 20, in the area between the rolls 16, 17, using a suction box, coanda air blows or foil blades, for example. The other roll, preferably the first one, can also be underpressurized. In the embodiment set forth, the drive motor is inside the larger roll 17.

As shown in FIG. 2, the belt conveyor also comprises adjustment elements 21, which are arranged in connection with the frame construction and at least one of the rolls 16 or 17. Consequently, the belt loop tension can be adjusted with the adjustment elements by changing the relative position of the rolls 16, 17. In the embodiment set forth in FIGS. 2 and 3, the adjustment elements 21 are arranged between the rearmost roll 17 and the frame construction 15 in the travel direction of the web threading tail. In this case the concerned roll 17 can be moved relative to the frame construction 15.

According to the invention, the adjustment elements 21 surprisingly also comprise transfer elements 22, which are arranged in connection with both edges of the frame construction 15. In addition, the transfer elements 22 are arranged to act in co-operation for moving the roll 17 by operating the transfer elements 22 from one side of the frame construction 15. This co-operation can thus be used to move both ends of the roll simultaneously, and above all, to the same extent. Consequently, after aligning the roll correctly once, the alignment is maintained unchanged irrespective of the use of the adjustment elements. This speeds up the belt loop change remarkably and eliminates alignment errors and problems caused thereby. In other words, savings are made in both maintenance time and accessories.

For moving both ends of the roll 17 simultaneously, arranged between the transfer elements 22 there is a connecting element 23. In addition, the transfer elements are similar with each other as regards their transfer properties. Consequently, both ends of the roll can be moved at the same time and to the same extent by simply using the connecting element. According to the invention, the connecting element 23 is arranged rotably to the frame construction 15, more precisely to the side plates 18 and 19. A rotating movement can easily transfer the moment and the construction can be made small. For converting the rotating movement of the connecting element 23 into a roll 17 movement, each transfer element 22 comprises power transmission equipment 24, of which a part is arranged attached to the connecting element 23. Thus, by rotating the connecting element, the moment can be transferred to both transfer elements via the power transmission equipment. As power transmission elements it is possible to use a gear transmission or an eccentric transmission or other equipment used in the power transmission as is known in the art. A belt conveyor according to the invention is described below provided with a gear transmission.

Figure 4:
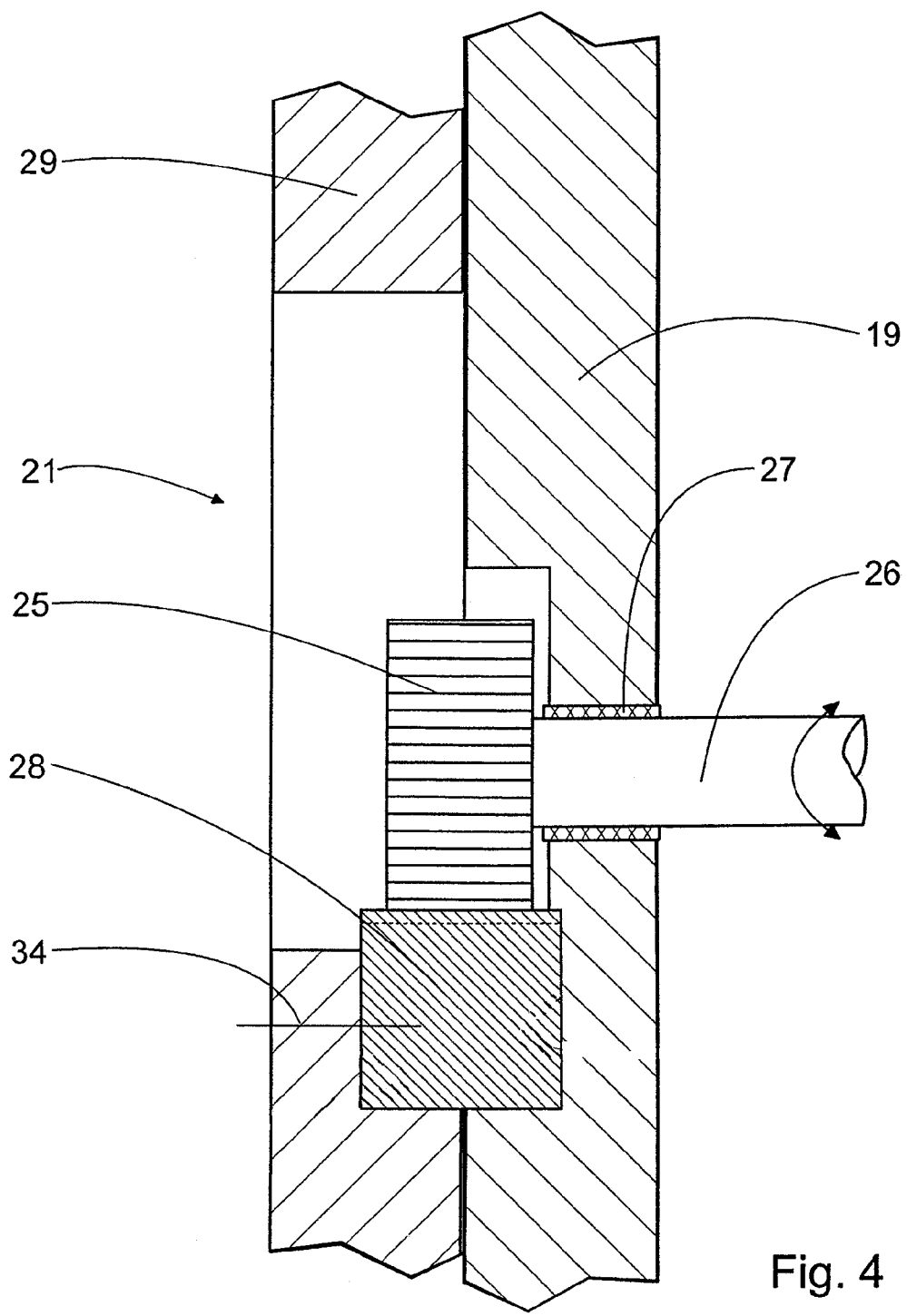
FIG. 4 is a cross-sectional view of a detail of a belt conveyor according to the invention.

In the embodiments of FIGS. 2-4 the power transmission equipment is composed of a gear transmission. A gear transmission is durable and reliable in use. In addition, it requires little mounting space. According to the invention, the gear transmission comprises a gear 25, which is fastened to the connecting element 23. Here the connecting element 23 is composed of a torsionally rigid shaft 26 extending through the frame construction 15 (FIG. 3). Both ends of the shaft 26 are fitted with the previously mentioned gears 25. The shaft 26 is supported to the side plates 18 and 19 with suitable plain bearings 27, such as bushings. That is, the shaft is kept in place in relation to the frame construction.

In addition, the gear transmission comprises a gear rack 28, which is arranged in connection with the adjustment elements 21. FIG. 3 shows a functional gear rack, which is integrated to the bracket 29 of the roll 17. In other words, the bracket 29 has a suitable opening 30, at the edge of which there is machined a toothing corresponding with the gear 25. Here attached to the gear 25 there is additionally fastened a bolt head 31, whereat the shaft 26 can be rotated using for example a normal wrench or screwdriver.

FIG. 4 shows another method for carrying out the gear transmission. Here a separate gear rack is used, arranged between the frame construction and adjustment elements. For the gear rack 28, grooves corresponding to the gear rack 28 are machined both to the side plate 19 and to the bracket 29. The gear rack 28 is fastened to the bracket 29 with a screw 34, for example, but it is arranged mobile in relation to the side plate 19. This construction thus allows the movement of the bracket while the gear rack additionally functions as a guide construction. The guide construction supports the brackets and makes the transfer of the roll linear. This solution can be formed, if required, already in existing belt conveyors. Functionally similar parts are referred to with identical reference numbers.

In addition to transferring the roll, it must be tensioned in place. For this, the adjustment elements 21 comprise locking elements 35, which are arranged in connection with both edges of the frame construction 15. In the same way as in the transfer elements, locking is arranged to act in co-operation for operating both locking elements 35 simultaneously from one side of the frame construction 15. Consequently, operation on the outermost side of the frame construction is completely avoided. According to the invention, the locking elements 35 comprise a cross-shaft 36, which is arranged to extend to between both locking elements 35 in the cross direction of the frame construction 15 for providing their co-operation. The number of cross-shafts 36 is preferably only two. The bracket 29 is also provided with oval holes 37 for the cross-shafts 36. Thus the cross-shafts and the said holes also form a guide construction and allow the movement of the brackets. Here each cross-shaft 36 is composed of a stud bolt 38, in the adjustment element 21 of which, located on the opposite side to the operating side of the frame construction 15, there is fixedly arranged a nut 39 corresponding to the stud bolt 38. With a suitable construction, the nut is kept unrotating, but allows the movement of the bracket. In this case, by rotating the stud bolt from one side, both brackets can be released simultaneously. On the other hand, by arranging oval holes in the side plates, mere threaded holes can be simply arranged in the bracket for the stud bolts. In this case the above mentioned nuts are not needed.

In the method according to the invention, for changing the belt loop, the belt loop is first loosened by changing the relative position of the rolls by means of the adjustment elements. After this, the worn out or damaged belt loop is removed from around the rolls and a new belt loop is set around the rolls. Finally the belt loop is tensioned by changing the relative position of the rolls by means of the adjustment elements. According to the invention, the adjustment elements are operated from one side of the frame construction for moving both ends of the roll. This speeds up the belt loop change remarkably and the changing operation is safe. In addition, both ends of the roll are moved simultaneously and to the same extent. Consequently, the alignment of the roll becomes automatically correct. In the belt conveyor according to the invention, the adjustment elements also comprise locking elements arranged in connection with both edges of the frame construction, which according to the invention are simultaneously operated from one side of the frame construction. Preferably the adjustment elements and the locking elements are operated from the same side. The locking is first released after which it is possible to move the roll. Finally the locking is activated, whereat the belt loop change is completed fast and accurately.

In the belt conveyor application, the relative distance between the rolls 16, 17 is in practice 200-600 mm, more commonly 300-500 mm. Correspondingly, the belt loop width is approximately 550 mm, and the belt loop is illustrated with a broken line in FIG. 3. If necessary, vacuum equipment is used inside the frame construction for underpressurizing the belt loop and/or the roll. Irrespective of the application, the adjustment elements according to the invention simplify and speed up the maintenance of the belt conveyor. When adjusting from one side of the frame construction, both ends of the roll move to the same extent and simultaneously. In addition to the adjustment, tightening and loosening can be carried out simultaneously from the same side. Consequently, changing the belt loop is fast and safe. In addition, misalignment of rolls is avoided. In practice, a faster belt loop change shortens the maintenance shutdown even by an hour.

We claim:

1. A belt conveyor for transferring a web threading tail in a web manufacturing machine, the belt conveyor comprising:
    a frame having a first side plate having a first edge and a second side plate having a second edge, and a first bracket mounted to the first side plate and a second bracket mounted to the second side plate;
    a first roll mounted to the frame, the first roll defining a first axis, the first roll being mounted between the first side plate first edge and the second side plate second edge of the frame;
    a second roll adjustably mounted to the first bracket and the second bracket for motion toward and away from the first roll;
    a shaft mounted to the frame first side plate and second side plate, and having disposed thereon two gears spaced from each other in the cross machine direction;
    two racks, one associated with each of the first bracket and the second bracket, and each rack engaged with one of the two gears, the shaft being rotatable to cause motion of the second roll towards and away from the first roll in spaced parallel relation;
    a belt loop which extends around the first roll and the second roll, and which travels in a machine direction, wherein rotation of the shaft moves the second roll in the machine direction with respect to the first roll to adjust tension in the belt loop;
    wherein the shaft is arranged to be operated from a first side of the frame defined by the first edge, and wherein locking elements are arranged in connection with the frame first plate and the frame second plate, the locking elements being arranged to act in co-operation for locking the first frame plate to the first bracket and the second frame plate to the second bracket simultaneously from said first side of the frame, wherein the locking elements comprise:
    a first cross-shaft having threaded portions extending in the cross machine direction above the gears;
    a second cross-shaft having threaded portions extending in the cross machine direction below the gears;
    portions of the brackets which define holes which extend in the machine direction and through which the first cross-shaft and the second cross-shaft extend, said holes providing clearance for the cross-shafts as the distance between the first roll and the second roll is adjusted; and
    threaded portions fixed with respect to the second bracket which receive the first and second cross-shafts, such that rotation of said cross-shafts locks the side plates to the brackets.

2. The belt conveyor of claim 1, wherein each cross-shaft is a stud bolt, and wherein the threaded portions comprise a nut fixedly arranged on each stud bolt.

3. The belt conveyor of claim 1 wherein a vacuum is arranged inside the belt loop.

4. The belt conveyor of claims 1 wherein one or both of the first roll and the second roll is/are underpressurized.

5. A belt conveyor for transferring a web threading tail in a web manufacturing machine, the belt conveyor comprising:
    a frame having a first side plate spaced in a cross machine direction from a second side plate;
    a first roll mounted to the frame between the first plate and the second plate;
    a first bracket mounted to the first plate and a second bracket mounted to the second plate;
    adjustment elements including a rotatable element disposed on the brackets and side plates;
    a second roll mounted between the first bracket and the second bracket;
    a belt loop which extends around the first roll and the second roll, and which travels in a machine direction; wherein the rotatable element is rotatable to cause the adjustment elements, the first bracket, the second bracket, and the second roll to move with respect to the first plate and the second plate to adjust tension in the belt loop by changing the position of the second roll with respect to the first roll;
    a first cross-shaft having threaded portions extending in the cross machine direction above the rotatable element;
    a second cross-shaft having threaded portions extending in the cross machine direction below the rotatable element;
    portions of the brackets which define holes which extend in the machine direction and through which the first cross-shaft and the second cross-shaft extend, said holes providing clearance for the cross-shafts as the distance between the first roll and the second roll is adjusted; and
    threaded portions fixed with respect to the second bracket which receive the first and second cross-shafts, such that rotation of said cross-shafts locks the side plates to the brackets.

6. The belt conveyor of claim 5, wherein each cross-shaft is a stud bolt, and wherein the threaded portions fixed with respect to the second bracket which receive the first and second cross-shafts comprise fixed nuts.

7. A method for changing a belt loop in a belt conveyor for a web threading tail in a web manufacturing machine, the belt conveyor comprising a frame construction and at least a first roll and a second roll spaced from one another in a machine direction, with an underpressurized air permeable belt loop arranged around them, the belt conveyor having adjustment elements which are arranged in connection with the frame construction and the second roll, the adjustment elements including a rotatable element disposed on the frame construction, wherein the rotatable element is rotatable to cause the second roll to move with respect to the first roll to adjust the distance therebetween and thus to adjust tension in the belt loop by changing the position of the second roll with respect to the first roll, and a first cross-shaft having threaded portions extending in the cross machine direction above the rotatable element, and a second cross-shaft having threaded portions extending in the cross machine direction below the rotatable element, and portions of the frame construction which define holes which extend in the machine direction and through which the first cross-shaft and the second cross-shaft extend, said holes providing clearance for the cross-shafts as the distance between the first roll and the second roll is adjusted, and threaded portions fixed with respect to portions of the frame construction which receive the first and second cross-shafts, such that rotation of said cross-shafts locks the frame construction to restrict further motion of the first roll with respect to the second roll, the method comprising the steps of:

loosening the belt loop by changing the relative position of the rolls by means of the adjustment elements;

removing the belt loop from around the rolls;

placing a new belt loop around the rolls; and tensioning the belt loop by changing the relative position of the rolls by means of the adjustment elements, and locking the rolls into the changed position by securing the first cross-shaft and the second cross-shaft with respect to the frame construction, the changing of position and locking of the rolls being carried out from only one side of the frame construction for moving both ends of the second roll.0

8. The method of claim 7 wherein the step of changing the relative position of the rolls by means of the adjustment elements comprises moving both ends of the second roll simultaneously and to the same extent.

* * * * *